(12) United States Patent
Goransson

(10) Patent No.: US 7,185,933 B2
(45) Date of Patent: Mar. 6, 2007

(54) ADJUSTABLE FASTENING DEVICE

(75) Inventor: Anders Goransson, Katrineholm (SE)

(73) Assignee: Scania CV AB (publ) (SE)

( * ) Notice: Subject to any disclaimer, the term of this patent is extended or adjusted under 35 U.S.C. 154(b) by 205 days.

(21) Appl. No.: 10/479,564

(22) PCT Filed: May 30, 2002

(86) PCT No.: PCT/SE02/01029

§ 371 (c)(1),
(2), (4) Date: Dec. 3, 2003

(87) PCT Pub. No.: WO02/099293

PCT Pub. Date: Dec. 12, 2002

(65) Prior Publication Data

US 2004/0161296 A1 Aug. 19, 2004

(30) Foreign Application Priority Data

Jun. 5, 2001 (SE) .................................. 0101960

(51) Int. Cl.
*B62D 27/00* (2006.01)
(52) U.S. Cl. .................. 296/30; 296/203.01; 296/205; 403/382
(58) Field of Classification Search ........... 296/193.08, 296/203.04, 29, 30, 203.01, 204, 205; 52/289; 256/65.01; 403/382, 232.1, 189, 187, 403, 403/230, 262, 246, 199, 190, 231
See application file for complete search history.

(56) References Cited

U.S. PATENT DOCUMENTS

| | | | |
|---|---|---|---|
| 3,100,653 A | 8/1963 | Ibaugh et al. | |
| 4,193,233 A | * 3/1980 | VandenHoek et al. | ..... 52/126.4 |
| 4,611,948 A | 9/1986 | Johanson | |
| 2001/0034945 A1 | * 11/2001 | Smochek | ..................... 33/373 |

FOREIGN PATENT DOCUMENTS

NL 1 001 615 7/1997

* cited by examiner

*Primary Examiner*—Lori L. Coletta
(74) *Attorney, Agent, or Firm*—Ostrolenk, Faber, Gerb & Soffen, LLP

(57) ABSTRACT

Adjustable fastening element intended to be fitted to an end region of a transverse member of a vehicle chassis. The fastening element takes the form of a U-section element with a web portion of preferably uniform width and with mutually parallel flanges protruding from opposite side edges of this web portion. Each flange has running through it at least one oblong slitlike aperture, or has running through it two or more mutually aligned holes, for a fastening element, particularly a fastening bolt or fastening screw, whereby the fastening element can be fixed to the transverse member. The fastening element can be fitted straddling the end region of the transverse member, in one of various different positions relative to the end region of the member, with the flanges of the fastening element abutting against opposite side surfaces of the transverse member. The fastening element is fitted partly protruding axially beyond the end surface of the transverse member to form an extension element to the transverse member.

18 Claims, 2 Drawing Sheets

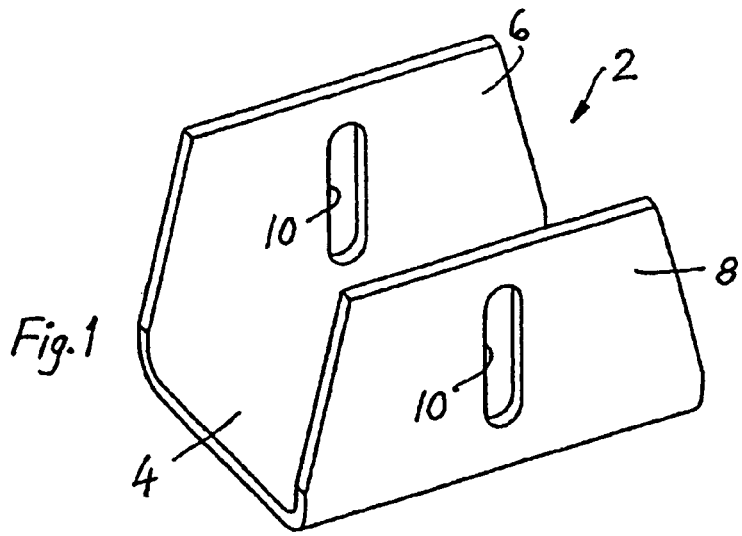
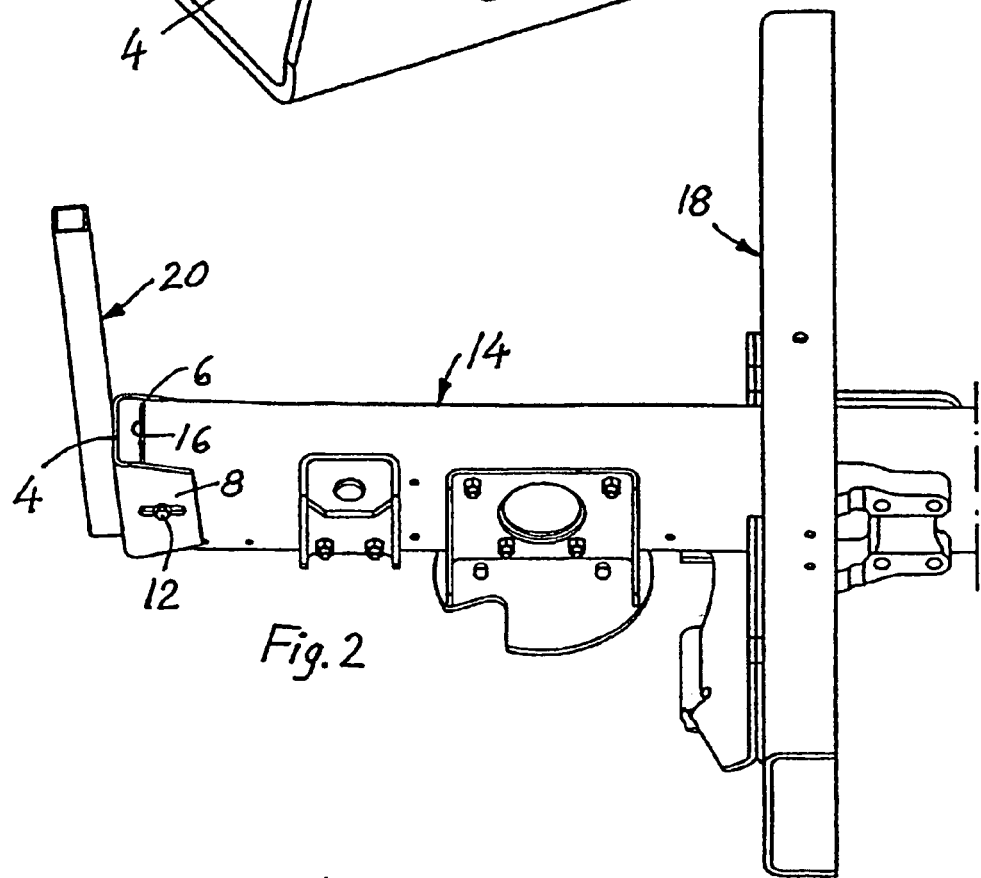
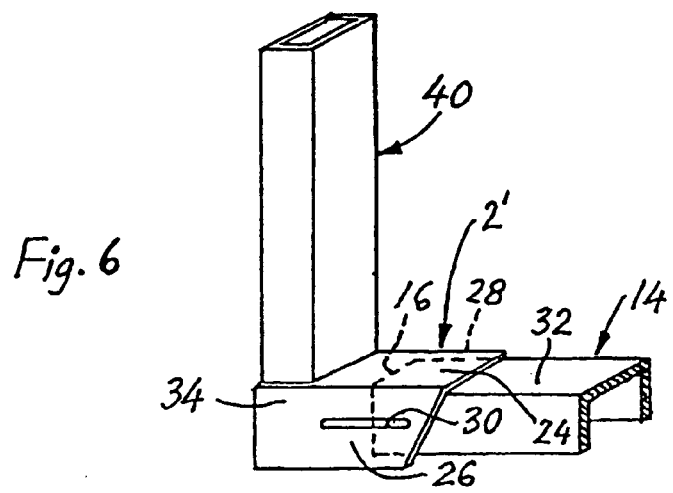

ADJUSTABLE FASTENING DEVICE

The present invention relates to an adjustable fastening element intended for fitting to an end region of a member of a vehicle chassis. Adjustable fastening elements of this kind are quite generally intended for structural systems of vehicles. The fastening element according to the invention is intended for fitting to an end region of a member of a vehicle chassis, particularly a transverse member of a bus chassis.

STATE OF THE ART

In the case of buses and trucks, Scania has become known inter alia for its special modular concept of chassis construction. The basic idea of the modularised construction of chassis for buses and trucks is to use a relatively limited range of standardised constructional components as a basis for nevertheless being able to offer customers a wide range of different chassis for different areas of application. Modularisation does in fact entail a very substantial reduction in the number of components and articles required to make it possible to offer a broad range of chassis. Chassis made up of standardised components also afford substantial advantages for bodybuilders in that, for example, the connection points between chassis and body will be situated at certain given points irrespective of the type of bus or truck concerned.

Examples of buses for different areas of application include tourist buses, urban buses and buses for long suburban routes. A bus chassis usually comprises three main modules, viz. forward module, middle module and rear module. These modules are themselves divided into submodules. In the frame structure for a chassis of modular construction for a bus, for example, the two longitudinal frame side members may be identical, and the same also applies to several of the transverse members which form part of the frame.

Thus in many cases, bus chassis intended for various types of buses and provided with transverse members of similar length may be delivered to superstructure/bodybuilders.

OBJECTS OF THE INVENTION

In some cases, however, the superstructure/bodybuilder needs a chassis in which one or more transverse members should differ in length from the others. Such cases include those where transverse members form outriggers to support body ribs.

A main object of the invention is therefore to be able to use a standard transverse member (i.e. a transverse member with a certain given standard length) in chassis for different customers despite the latter's different length requirements for the transverse member or members concerned.

Another object is to be able to use a standard transverse member despite different customers needing to be able to fasten ribs at different angles to transverse members serving as outriggers.

SUMMARY OF THE INVENTION

In the case of an adjustable fastening element of the kind indicated in the introduction, the abovementioned objects can be achieved according to the invention if the fastening element exhibits the features indicated below.

A distinguishing feature of such an adjustable fastening element is that it takes the form of a profiled element of substantially U-shaped cross-section which has a web portion of preferably uniform width which has projecting from its opposite side edges a pair of mutually parallel flanges, each of which has running through it at least one oblong slitlike aperture, or alternatively has two or more mutually aligned holes running through it, to accommodate fastening means (such as bolts or screws) whereby the fastening element can be fastened to the end region of the member. In such cases, the fastening element is so designed as to be easy to fit straddling the end region of the member in (at least two) different positions relative to the end region of the member, whereby these two flanges abut against opposite sides of the member, with at least part of the fastening element situated axially outside the end surface of the member so as to form an extension element to the member.

The fastening element may thus with advantage be so designed that it can be fitted directly straddling the end surface of the member fitted preferably as a chassis transverse member, with the web portion of the fastening element arranged transversely to the longitudinal direction of the member. Alternatively the fastening element may be so designed that it can be fitted straddling the upper side of the member, with the web portion abutting against the upper side of the member. In the first of these two cases, the slitlike aperture through each of the flanges may preferably be oriented substantially perpendicular to the web portion. In the second case the slitlike flange aperture may be oriented parallel with the web portion. The apertures through the flanges of the fastening element are preferably situated centrally to one another.

On the opposite side of the flanges from the web portion of the fastening element there may for example be fastened a structural element such as a rib. Using such a fastening element makes it easy to fasten a rib to a vehicle chassis transverse member serving as an outrigger. A standard member with a given length thereby becomes usable for chassis for different customers even if the latter require different sizes of ribs and different angular fastenings of ribs to ends of transverse members. Accordingly, the fastening element is delivered from the chassis manufacturer screwed firmly to the end of the member and can thereafter be easily adjusted to the superstructure bodywork to suit customer requirements before being welded permanently in the desired position.

BRIEF DESCRIPTION OF THE DRAWINGS

The invention will now be explained and exemplified below with reference to drawings which depict examples of some embodiments of an adjustable fastening element according to the invention.

The drawings are as follows:

FIG. 1 depicts in perspective a first embodiment of an adjustable fastening element intended for fitting to the end region of a member;

FIG. 2 depicts likewise in perspective an adjustable fastening element fastened to the lower end of a structural element and screwed firmly to the end region of a transverse member forming part of a chassis frame with frame side members;

FIG. 6 depicts finally in perspective another embodiment of an adjustable fastening element fitted to the end region of a member.

DESCRIPTION OF EMBODIMENTS

Figure 3:
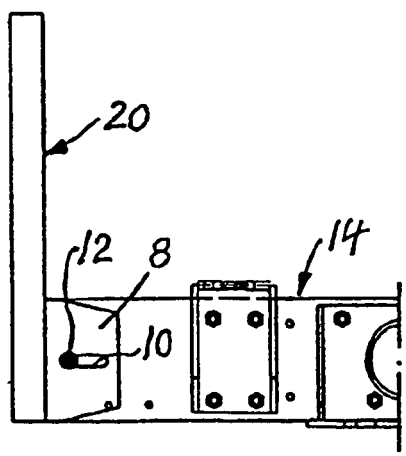
FIG. 3 depicts in side view the fastening element according to FIG. 2 in a position pushed as far in as possible towards the end of the transverse member.
Figure 4:
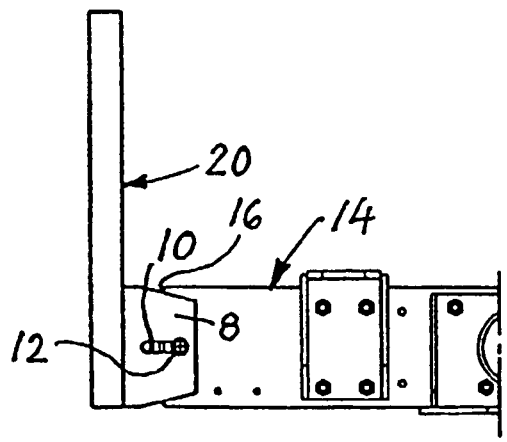
FIG. 4 depicts in side view the fastening element according to FIG. 2 in a position of being pulled as far out as possible from the end of the transverse member.
Figure 5:
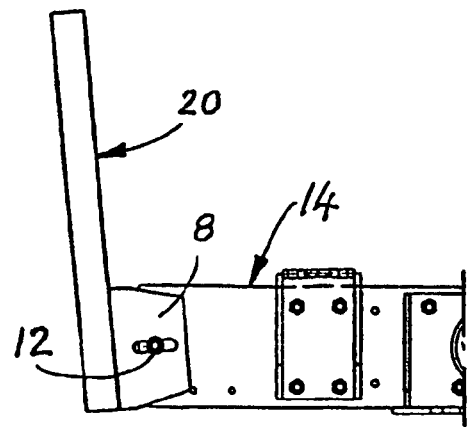
FIG. 5 depicts in side view the fastening element according to FIG. 2 in a position of being partly pulled out and being angled obliquely outwards.

FIG. 1 depicts a fastening element 2 with a U-like profile cross-section. The fastening element has a web portion 4 of uniform width which has projecting from its longitudinal side edges a pair of mutually parallel flanges 6 and 8. Each flange has running through it a slit 10 which extends substantially perpendicular to the web portion. The slit is intended to accommodate screws or bolts 12 to be used for fixing the fastening element 2 to the end of a member (such as the transverse member 14 in FIGS. 2–5). The fastening element 2 is intended to be fitted straddling the end region of the relevant member 14, as depicted in FIGS. 2–5. In its fitted state on the end of the member, the fastening element has its flanges 6,8 abutting closely to opposite side surfaces of the member. Depending on its particular position of fitting on the end of the member, the fastening element 2 will project a shorter or longer distance axially beyond the end surface 16 of the member 14, but in all circumstances the fastening element will form an extension of the transverse member 14. As particularly indicated in FIG. 2, the member 14 may constitute a transverse member forming part of a vehicle frame, e.g. for a bus chassis. To this end, the transverse member extends through a pair of frame side members 18 forming part of the vehicle frame, only one of which is visible in FIG. 2. Its open U-like profile shape means that the fastening element 2 can where necessary be fitted in an oblique position relative to the transverse member 14, i.e. with the web portion 4 arranged at an angle other than 90° to the longitudinal direction of the transverse member (see FIG. 5). In FIGS. 2–5 the fastening element 2 is depicted firmly attached (e.g. permanently welded) to the lower end of a substantially vertical structural element 20, which may be a hollow pillar or part of a rib not depicted in more detail, e.g. a rib for an undepicted vehicle body.

We refer finally to FIG. 6, which depicts another embodiment of an adjustable fastening element according to the invention. The fastening element, denoted in this case by ref 2', has a web portion 24 with a pair of mutually parallel protruding flanges 26,28, each of which has through it a slit 30 for a screw or bolt, corresponding to the screw 12 in FIGS. 2–5. The fastening element 2' is intended to be fitted straddling the upper side 32 of the transverse member, i.e. with the web portion 24 abutting against that upper side. The slits 30 in the flanges 26,28 extend in this case substantially parallel with the web portion 24. In FIG. 6 the fastening element 2' is depicted with extensions 34 of the flanges, by which flange extensions the fastening element is attached firmly to the lower end of a structural element 40.

The invention claimed is:

1. A combination of an end region of a member of a vehicle chassis with an adjustable fastening element, the combination comprising:

a fastening element comprised of a U-section element, which includes a web portion having opposite side edges and mutually parallel flanges attached to and protruding in the same direction from the opposite side edges of the web portion;

a member of a vehicle chassis, the member having an end region and terminating in an end surface, the member having opposite side surfaces;

the U-shaped fastening element being shaped with respect to the end region of the member to be fitted straddling the end region of the member and the member being adjustable into any of various positions relative to the end region of the member and the flanges of the fastening element abut against respective opposite ones of the side surfaces of the member;

the fastening element being fastened to the side surfaces of the member; the fastening element being shaped and sized as to project axially beyond the end surface of the member to form an extension element of the member;

wherein the fastening element being fastened to the member comprises at least one opening in each flange for a fastener;

the fastener in the flange engages the respective side surface of the member; and wherein the at least one opening in each flange comprises at least one oblong slitlike aperture.

2. The combination of claim 1, wherein the fastener comprises a fastening bolt or a fastening screw.

3. The combination of claim 1, wherein the web portion of the U-section element is of uniform width between the opposite side edges thereof along the length of the side edges.

4. The combination of claim 1, wherein the member is a transverse member of a chassis of a vehicle and the fastening element is at the end of the transverse member.

5. The combination of claim 1, wherein the slitlike aperture has such length with respect to the fastener thereof as to enable the position of the fastening element along the length of the member and with respect to the end region thereof to be adjusted.

6. The combination of claim 1, wherein the at least one opening comprises at least two mutually aligned holes in each flange of the U-section element.

7. The combination of claim 1, wherein one of the positions of the fastening element is straddling the end surface of the member with the web portion of the element arranged transversely to the longitudinal direction of the member and being axially spaced beyond the end surface of the member.

8. The combination of claim 1, wherein one of the positions of the fastening element is straddling one side surface of the member with the web portion of the fastening element abutting against the one side surface of the member.

9. The combination of claim 8, wherein the slitlike aperture has such length with respect to the fastener thereof as to enable the position of the fastening element along the length of the member and with respect to the end region thereof to be adjusted.

10. The combination of claim 1, wherein one of the positions of the fastening element is straddling the end surface of the member with the web portion of the element arranged transversely to the longitudinal direction of the member and being axially spaced beyond the end surface of the member, wherein the opening in each flange has an orientation substantially perpendicular to the web portion of the fastening element.

11. The combination of claim 10, wherein the slitlike aperture has such length with respect to the fastener thereof as to enable the position of the fastening element along the length of the member and with respect to the end region thereof to be adjusted.

12. The combination of claim 1, wherein one of the positions of the fastening element is straddling one side surface of the member with the web portion of the fastening element abutting against the one side surface of the member.

13. The combination of claim 1, wherein the slitlike aperture has such length with respect to the fastener thereof as to enable the position of the fastening element along the length of the member and with respect to the end region thereof to be adjusted.

14. The combination of claim 1, wherein the opening in each flange has an orientation substantially perpendicular to the web portion of the fastening element.

15. The combination of claim 1, wherein the opening in each flange has an orientation substantially parallel to the web portion of the fastening element.

16. The combination of claim 1, wherein the openings in each of the flanges are situated centrally to one another and are thereby aligned along the length of the apertures.

17. The combination of claim 4, wherein the flanges have sides thereof that are opposite the web portion; a structural element which defines part of a superstructure of a vehicle of which the member is a part, and the fastening element and the structural element being so positioned that the fastening element fastens the structural element to the member such that the structural element comprises a transverse outrigger of a frame of the vehicle.

18. The combination of claim 1, further comprising extensions on the flanges which project beyond the web of the fastening element and the extensions being adapted for connection to a structural element whereby the fastening element is connected to the structural element.

* * * * *